(12) United States Patent
Martin

(10) Patent No.: US 9,119,236 B1
(45) Date of Patent: Aug. 25, 2015

(54) MONITORING SYSTEM CONTROL TECHNOLOGY

(75) Inventor: Jean-Paul Martin, Oakton, VA (US)

(73) Assignee: Alarm.com Incorporated, Vienna, VA (US)

( * ) Notice: Subject to any disclaimer, the term of this patent is extended or adjusted under 35 U.S.C. 154(b) by 730 days.

(21) Appl. No.: 13/412,433

(22) Filed: Mar. 5, 2012

Related U.S. Application Data

(60) Provisional application No. 61/449,302, filed on Mar. 4, 2011.

(51) Int. Cl.
*H05B 37/02* (2006.01)

(52) U.S. Cl.
CPC ........................................ *H05B 37/02* (2013.01)

(58) Field of Classification Search
CPC ................................ G08B 13/00; G08B 29/00
USPC ......................................................... 315/297
See application file for complete search history.

(56) References Cited

U.S. PATENT DOCUMENTS

| | | | |
|---|---|---|---|
| 5,483,224 A | 1/1996 | Rankin et al. | |
| 5,499,014 A | 3/1996 | Greenwaldt | |
| 6,011,967 A | 1/2000 | Wieck | |
| 6,049,272 A | 4/2000 | Lee et al. | |
| 6,094,140 A | 7/2000 | Parente | |
| 6,215,405 B1 | 4/2001 | Handley et al. | |
| 6,255,944 B1 | 7/2001 | Addy | |
| 6,331,816 B1 | 12/2001 | Myllymäki | |
| 6,437,692 B1 | 8/2002 | Petite et al. | |
| 6,542,076 B1 | 4/2003 | Joao | |
| 6,667,688 B1 | 12/2003 | Menard et al. | |
| 6,741,174 B2 | 5/2004 | Rhoades et al. | |
| 7,076,211 B2 | 7/2006 | Donner et al. | |
| 2002/0008619 A1 | 1/2002 | Lerg et al. | |
| 2002/0067253 A1 | 6/2002 | Trajkovic et al. | |
| 2002/0080029 A1 | 6/2002 | Menard et al. | |
| 2002/0103758 A1 | 8/2002 | Powell | |
| 2002/0126009 A1 | 9/2002 | Oyagi et al. | |
| 2010/0277300 A1* | 11/2010 | Cohn et al. | 340/506 |

* cited by examiner

*Primary Examiner* — John Poos
*Assistant Examiner* — David Mattison
(74) *Attorney, Agent, or Firm* — Fish & Richardson P.C.

(57) ABSTRACT

Systems and techniques are described for providing control of a monitoring system. In some implementations, a monitoring device is located in a building and is configured to monitor at least a portion of the building based on output from one or more sensors. A monitoring server is located remote from the building and is configured to communicate with the monitoring device. The monitoring server may be configured to translate one or more parameters received from a client device into an interpreted monitoring script and a trigger that causes performance of the interpreted monitoring script. The monitoring device may include an interpreter configured to determine that the trigger has been met and initiate performance of the interpreted monitoring script to evaluate a monitoring rule in accordance with one or more configurable parameters.

18 Claims, 10 Drawing Sheets

MONITORING SYSTEM CONTROL TECHNOLOGY

CROSS REFERENCE TO RELATED APPLICATIONS

The present application claims the benefit of U.S. Provisional Application No. 61/449,302, filed Mar. 4, 2011, which is incorporated herein by reference in its entirety for all purposes.

TECHNICAL FIELD

This disclosure relates to control of monitoring systems and devices.

BACKGROUND

Many people equip homes and businesses with monitoring systems (e.g., security systems) to provide increased security for their homes and businesses. A monitoring system generally includes one or more monitoring devices configured to monitor a person's home or business. For example, the monitoring devices may include or be in communication with one or more sensors configured to generate signals indicative of a condition of the person's home or business. The monitoring system may be configured to take certain actions in response to receiving the generated signals from the one or more sensors. For example, the monitoring system may send an alert to a central monitoring location.

SUMMARY

Techniques are described for control of a monitoring system. For example, monitoring scripts may be downloaded to monitoring devices included in the monitoring system. The monitoring scripts may each include a small sets of instructions related to the operation of the monitoring devices. The monitoring scripts may be customized by a user of the monitoring system and sent to the user's monitoring devices in real-time.

Implementations of the described techniques may include hardware, a method or process implemented at least partially in hardware, or a computer-readable storage medium encoded with executable instructions that, when executed by a processor, perform operations.

The details of one or more implementations are set forth in the accompanying drawings and the description below. Other features will be apparent from the description and drawings, and from the claims.

DETAILED DESCRIPTION

Figure 1A:
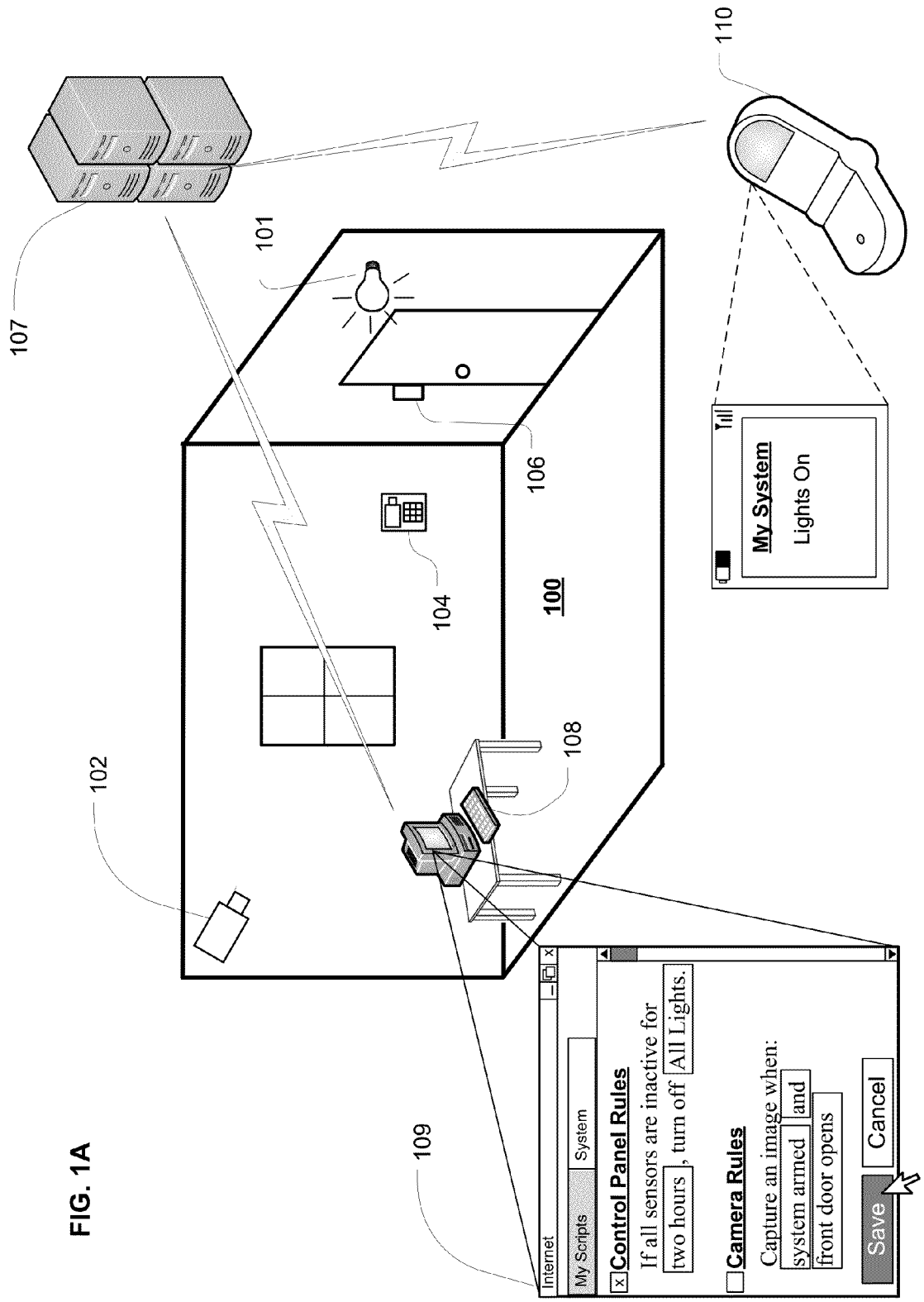
FIGS. 1A-1E illustrate an example of a monitoring system that includes multiple monitoring devices and a monitoring server.

Monitoring systems, such as security systems, are employed to monitor the condition of property. For example, a homeowner may employ a monitoring system in a home to protect the home from burglary and/or fire, to remotely view areas within the home, and/or to remotely control various appliances. The monitoring system may include one or more monitoring devices, such as cameras, motion sensors, entry sensors, smoke detectors, and control panels.

FIGS. 1A-1E illustrate an example of a monitoring system that includes multiple monitoring devices and a monitoring server. As shown in FIG. 1, a monitoring system 100 is installed in a user's home, which may include one or more appliances (e.g., one or more lights 101). The monitoring system 100 includes three monitoring devices: a camera 102, a control panel 104, and an entry sensor 106. The monitoring devices may communicate, through wired or wireless communication systems, with each other and/or a remote monitoring server 107 operated by a provider or servicer of the monitoring system 100. Traditional monitoring systems have set responses to predefined events. For instance, an entry sensor opening while the monitoring system is armed will trigger a siren and may lead to the reporting of the alarm to the monitoring server 107.

In a traditional monitoring system, the one or more monitoring devices may be controlled by firmware stored in the control panel. The firmware is a full set of instructions that define all of the operations and functionality of the monitoring system. In these traditional monitoring systems, the installer and user options available at the monitoring system can change behavior slightly, but do not allow a significant degree of customization. Specifically, an installer or user of the monitoring system will only be able to control the operation of the monitoring devices to the extent to which the firmware supports the desired operation. For example, in a traditional monitoring system, an installer or user may only be able to configure the control panel 104 to respond to entries into the house detected by the entry sensor 106 by causing a siren to sound and/or sending an alert to monitoring server 107. However, the firmware installed in the control panel 104 may not, for example, permit a user to base the response to an entry on a time of day.

In order to support new functionality in a traditional monitoring system, the user needs to download a new or updated version of the firmware to the control panel. However, these updates require the communication of a whole firmware package. In other words, every time a user wants to add different functionality to a traditional monitoring system, the user is required to entirely replace the firmware. Where the firmware is provided from a remote monitoring server, these firmware updates may require an amount of communication bandwidth that is expensive to the user and/or the entity that supports the monitoring system.

In the monitoring systems described herein, one or more of the monitoring devices in the monitoring system include an interpreter instead of the traditional firmware described above. The interpreter is configured to interpret monitoring scripts received from the monitoring server 107. In some implementations, the interpreter is made up of two main components: a programming language interpreter that executes monitoring scripts/programs, and a trigger manager that decides which monitoring script/program to execute in response to a given panel or sensor event.

The monitoring scripts define the functionality of the monitoring system and devices therein. In particular, the monitoring scripts may include one or more instructions or rules that, when executed by the interpreter, define the manner in which monitoring signals received by the monitoring device are to be handled. The monitoring scripts are designed to be small in size (e.g., a size that is larger than, but on the order of an alarm code or signal and that is smaller than a firmware upgrade), because they define a specific functionality selected by the user. Therefore, communicating the monitoring scripts to the monitoring devices requires far less communication bandwidth and development time than the firmware updates required by traditional monitoring systems.

With regard to FIG. 1A, the camera 102 and the control panel 104 each include an interpreter. To define the functionality of the monitoring devices included in the monitoring system 100, a user may communicate with the monitoring server 107 through a client device 108. For example, a user may use the client device 108 to access a webpage 109 associated with the monitoring server 107 and pick a set of monitoring functions for each of the camera 102 and the control panel 104 with its associated sensors. In alternative implementations, only the control panel 104 includes an interpreter. In these alternative implementations, the control panel 104 controls the camera 102 and entry sensor 106 through the scripts received from the monitoring server 107. However, any monitoring devices included in the monitoring system 100 may include an interpreter and the various monitoring devices may communicate with one another and contribute to or control one another's functionality. Moreover, the client device may be any type of interactive device that is configured for network connection. For example, the client device 108 may be a mobile telephone, a PDA, a desktop or laptop computer, or a network-connected television. The client device 108 need not be located in the user's home and configuration of the monitoring system 100 through the client device 108 may occur from a remote location.

The monitoring server 107 may include the functionality to communicate with other client devices. For example, as shown in FIG. 1A, the monitoring server 107 may be configured to communicate with a mobile device 110. In some implementations, the monitoring server 107 may communicate various information about the monitoring system 100 to the mobile device 110. Specifically, the monitoring server 107 may communicate status information regarding the appliances or monitoring devices to the mobile device 110. For example, the monitoring server 107 may be configured to send information regarding whether the lights 101 are turned on or off. The monitoring system 107 also may be configured to accept various commands from the mobile device 110 regarding the monitoring system 100, including, for example, the selection of monitoring functions through interaction with webpage 109.

As shown in FIG. 1A, a user of client device 108 may, through interaction with website 109, select and edit multiple rules for controlling the monitoring devices in monitoring system 100. For example, the user may select from one or more rules that correspond to the operation of the control panel 104 and the camera 102. In an example of one such rule, the user may specify that the control panel 104 is to turn off all lights connected to the control panel 104, if all sensors are inactive for two hours. As will be described in greater detail below, in some implementations, the rules presented to the user through webpage 109 may be based on rule templates and the user may specify various parameters to complete one or more of the rule templates. As shown in FIG. 1A, the user may select parameters such as the amount of time the sensors are inactive and the identification of the appliances that are turned off. In some examples, the user may create rules from scratch without the use of a template.

Figure 1B:
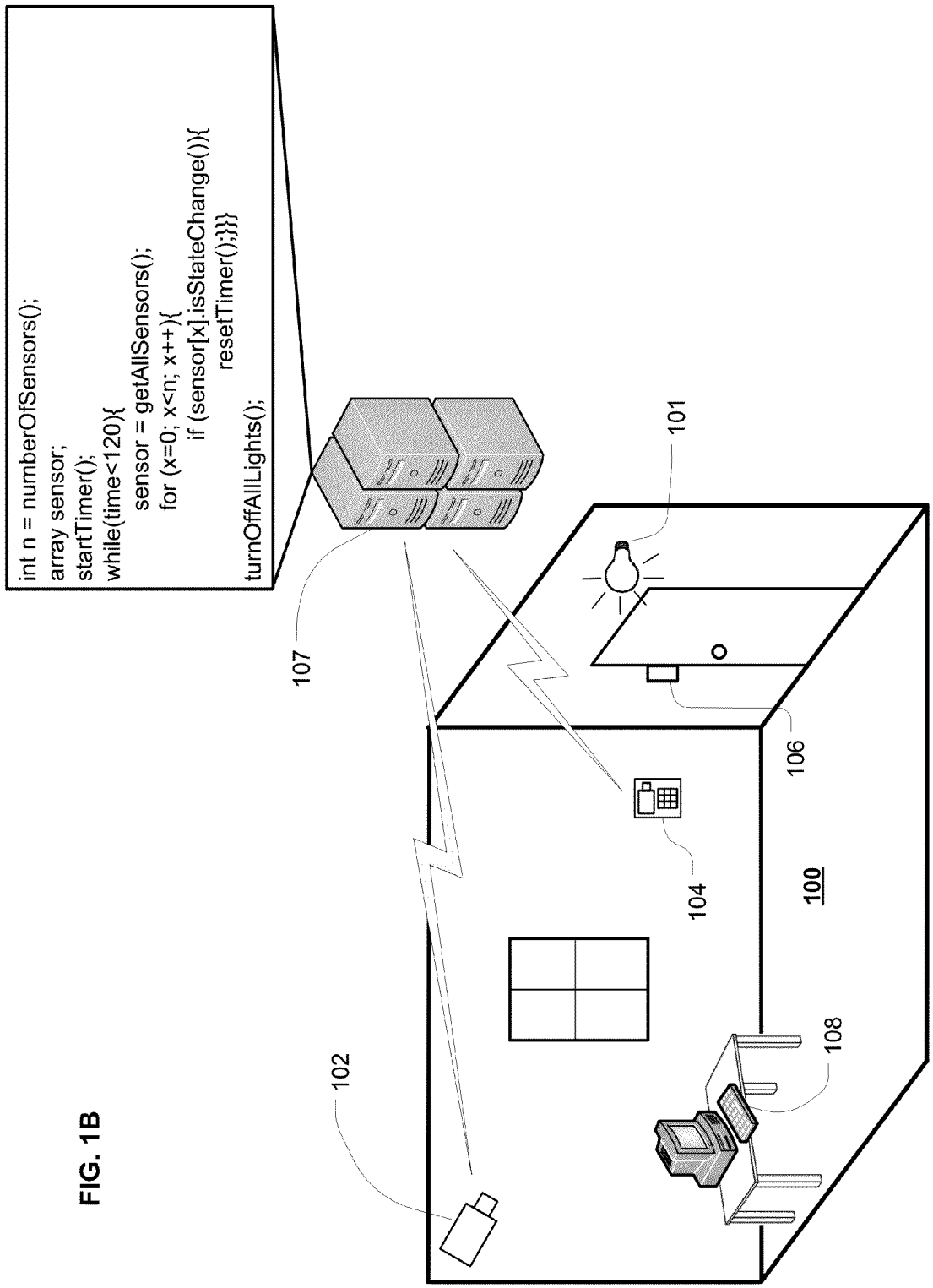

Once the user has input the rules to implement in the monitoring system 100, the inputted rules and/or parameters are sent to the monitoring server 107. As a result, the monitoring server 107 creates one or more monitoring scripts to send to the camera 102 and/or control panel 104, as shown in FIG. 1B. For example, the user may select to turn off all lights connected to the control panel 104, if all sensors are inactive for two hours. The monitoring server 107 may translate this rule into a monitoring script that may be interpreted by an interpreter included in the control panel 104. The monitoring script may comprise interpretable statements or codes based on a programming language. The programming language may be a high-level programming language such as C++, Java or Python and may include a proprietary interpreted language. In other examples, the script created by the monitoring server 107 may be any type of executable instructions that the control panel 104 is able to execute upon receipt.

Once the monitoring server 107 creates a monitoring script, the monitoring server 107 communicates the script to a monitoring device that includes an interpreter. For example, the monitoring server may send the above-described monitoring script to the control panel 104. In some implementations, one or more rules selected by a user may require the interaction of multiple monitoring devices that include interpreters. In these implementations, the monitoring server 107 translates the rules into multiple monitoring scripts that are sent to the multiple monitoring devices and the multiple monitoring scripts may be configured to interact with each other. For example, a first monitoring script may be sent to the camera 102 and a second monitoring script may be sent to the control panel 104. The first monitoring script may specify that the camera 102 sends an alert message to the control panel 104 if motion is sensed between the hours of 10 p.m. and 6 a.m. The second monitoring script may specify that the control panel sends an alarm message to the monitoring server 107 if the control panel receives the alert message from the camera 102 and the entry sensor 106 has been triggered within the previous five minutes.

Figure 1C:
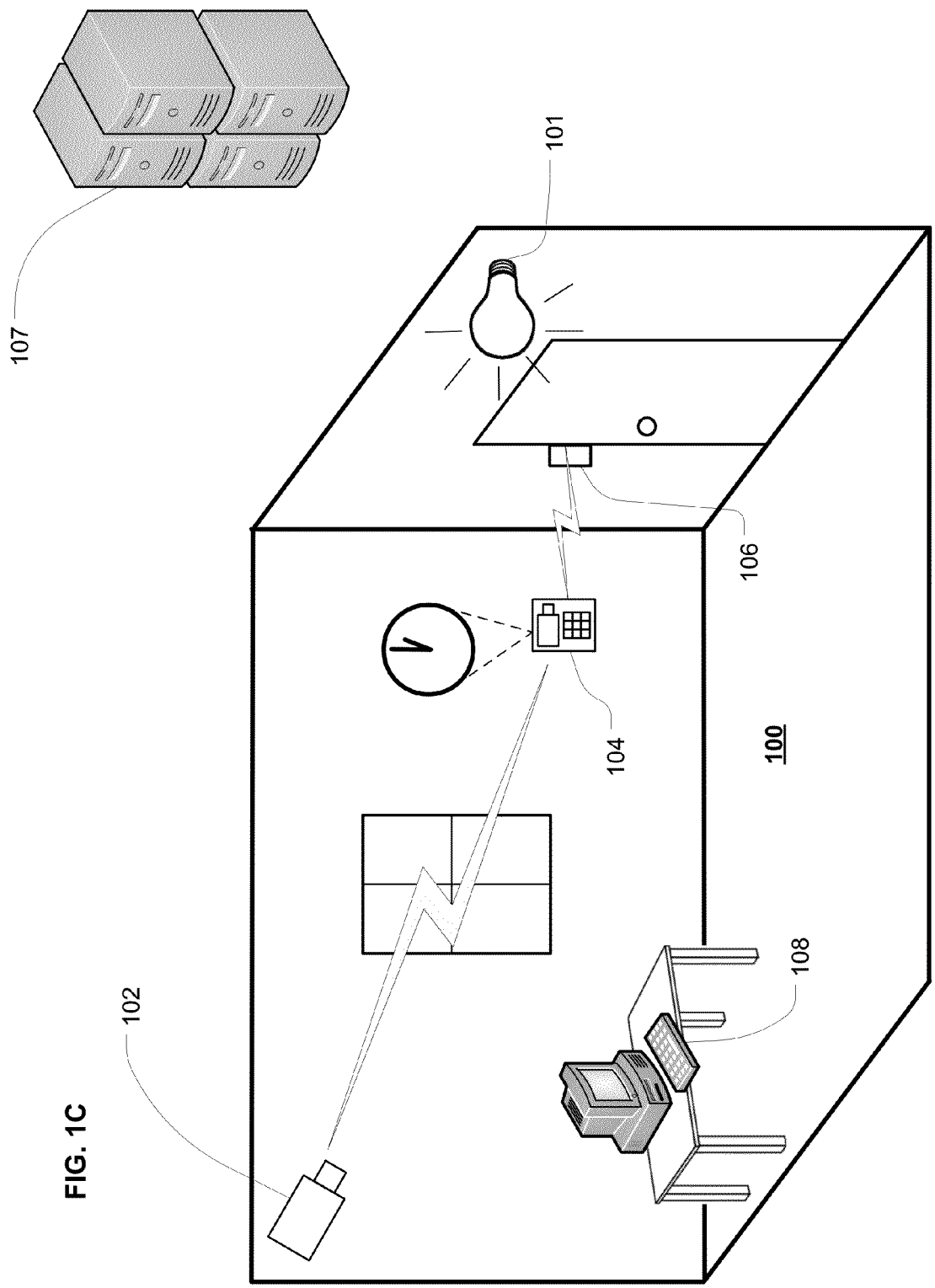

Once a monitoring script has been sent to a monitoring device, the interpreter on the monitoring device executes the monitoring script. As shown in FIG. 1C, the control panel 104 may run the above-described monitoring script that turns off all lights 101 connected to the control panel 104, if all sensors are inactive for two hours. In order to execute this script, the control panel 104 monitors the signals received from camera 102 and entry sensor 106. In some implementations, in order to run the monitoring script, the control panel 104 may employ triggers that act similar to interrupts. Triggers will be described in greater detail below. Additionally or alternatively, the script may employ various timers or polling routines.

Figure 1D:
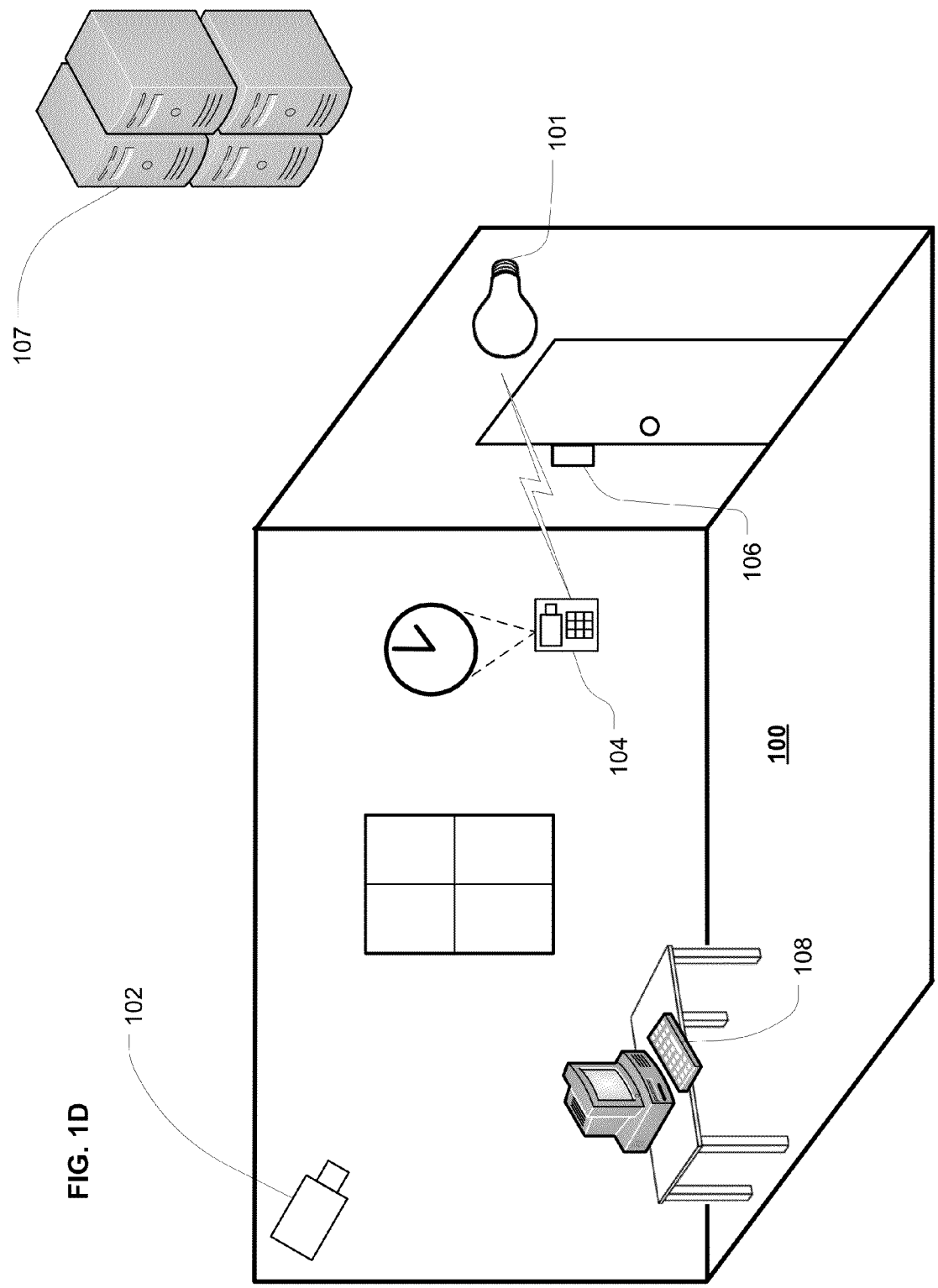
Figure 1E:
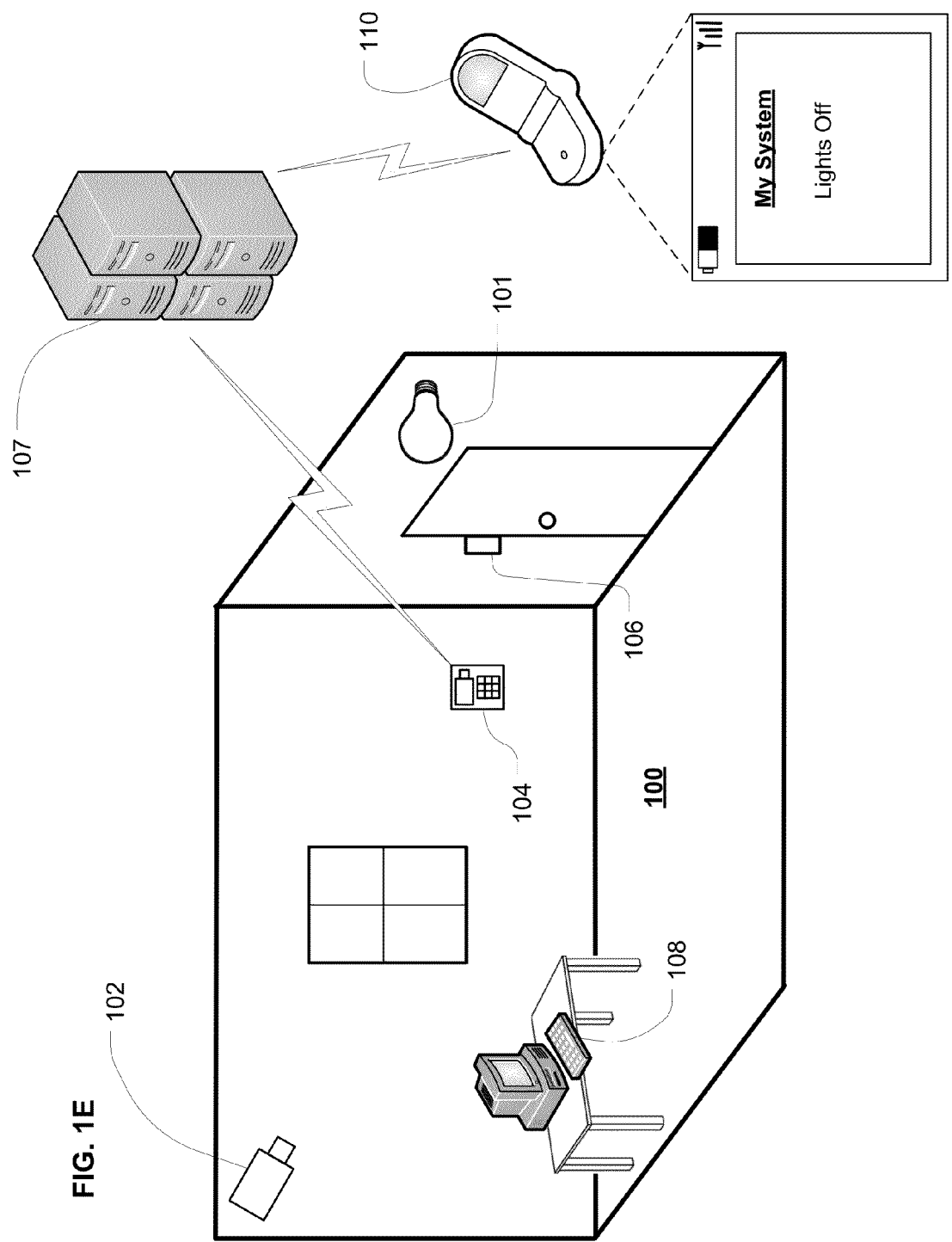

As shown in FIG. 1D, once a rule included in a script has been met, a monitoring device may take an associated action. For example, as a result of determining that all sensors connected to the monitoring system 100 are inactive for two hours, the control panel 104 may turn off the lights 101. Moreover, as described above, the control panel 104 may be configured to send periodic updates regarding the status of the monitoring system 100 to monitoring server 107. Monitoring server 107 may communicate the status of the monitoring system to mobile device 110, as shown in FIG. 1E.

Figure 2:
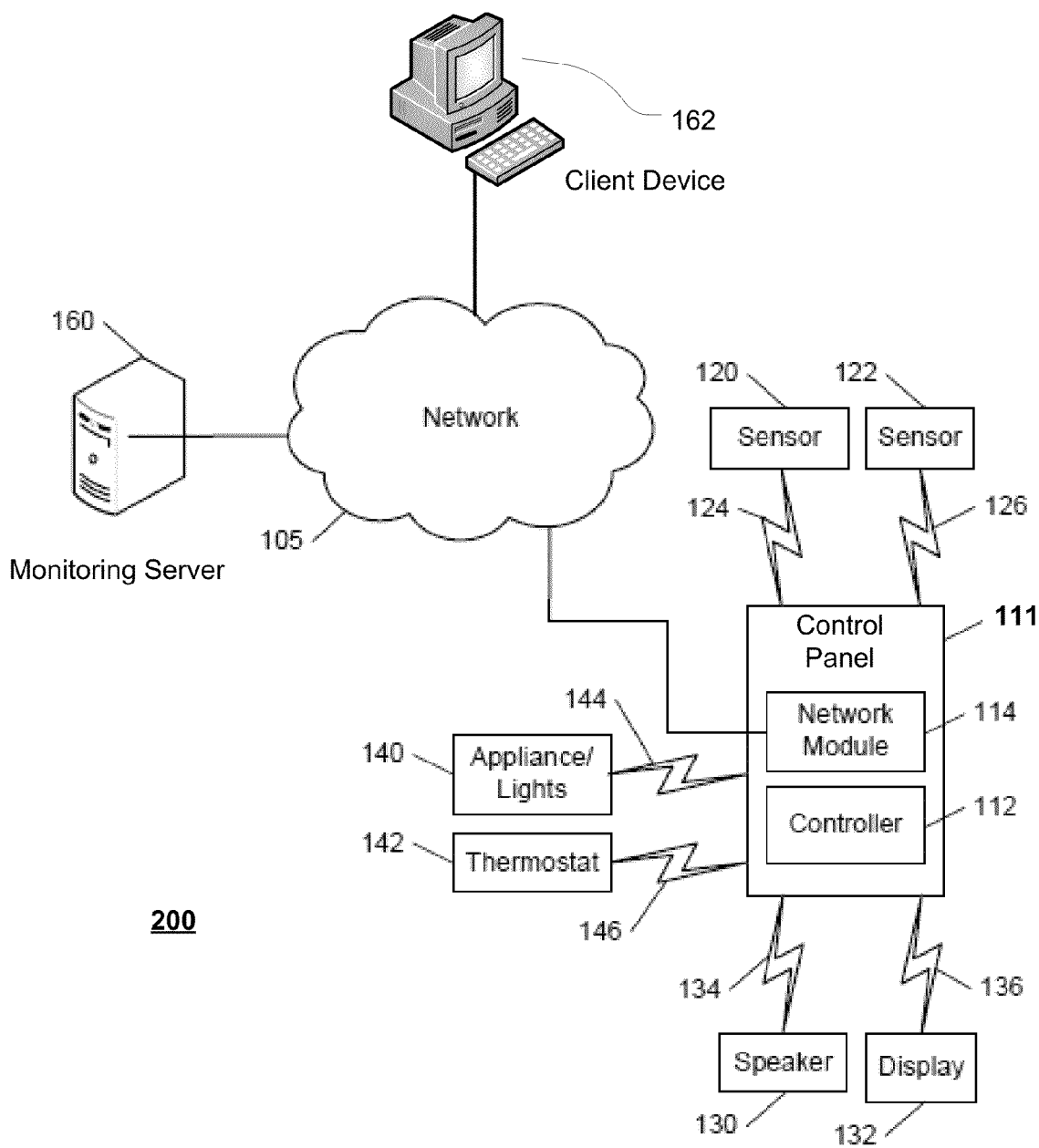
FIG. 2 illustrates a block diagram of an example of a monitoring system.

FIG. 2 illustrates a block diagram of an example of a monitoring system employing an interpreter. The monitoring system 200 includes a network 105, a control panel 111, and a monitoring server 160. In the implementation illustrated in FIG. 2, the control panel 111 is shown and will be described as the only monitoring device that includes an interpreter. As such, the control panel 111 implements the monitoring functionality for the entire monitoring system 200. However, in other implementations other monitoring devices included in the monitoring system 200 also may include interpreters, such that implementation of the monitoring functionality is distributed throughout the system.

In some examples, the network 105 facilitates communications between the control panel 111 and the monitoring server 160. The network 105 is configured to enable exchange of electronic communications between devices connected to the network 105. For example, the network 105 may be configured to enable exchange of electronic communications between the control panel 111 and the monitoring server 160. The network 105 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 105 may include multiple networks or subnetworks, each of which may include, for example, a wired or wireless data pathway. The network 105 may include a circuit-switched network, a packet-switched data network, or any other network able to carry electronic communications (e.g., data or voice communications). For example, the network 105 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 105 may include one or more networks that include wireless data channels and wireless voice channels. The network 105 may be a wireless network, a broadband network, or a combination of networks including a wireless network and a broadband network.

The control panel 111 includes a controller 112 and a network module 114. The controller 112 includes the interpreter. Thus, the controller 112 is configured to control a monitoring system (e.g., a home alarm or security system) that includes the control panel 111. In some examples, the controller 112 may include a processor or other control circuitry configured to execute instructions of a program that controls operation of an alarm system. In these examples, the controller 112 may be configured to receive input from sensors, detectors, or other devices included in the alarm system and control operations of devices included in the alarm system or other household devices (e.g., a thermostat, an appliance, lights, etc.). For example, the controller 112 may be configured to control operation of the network module 114 included in the control panel 111.

The network module 114 is a communication device configured to exchange communications over the network 105. The network module 114 may be a wireless communication module configured to exchange wireless communications over the network 105. For example, the network module 114 may be a wireless communication device configured to exchange communications over a wireless data channel and a wireless voice channel. In this example, the network module 114 may transmit alarm data over a wireless data channel and establish a two-way voice communication session over a wireless voice channel. The wireless communication device may include one or more of a GSM module, a radio modem, cellular transmission module, or any type of module configured to exchange communications in one of the following formats: GSM or GPRS, CDMA, EDGE or EGPRS, EV-DO or EVDO, UMTS, or IP.

The network module 114 also may be a wired communication module configured to exchange communications over the network 105 using a wired connection. For instance, the network module 114 may be a modem, a network interface card, or another type of network interface device. The network module 114 may be an Ethernet network card configured to enable the control panel 111 to communicate over a local area network and/or the Internet. The network module 114 also may be a voiceband modem configured to enable the alarm panel to communicate over the telephone lines of Plain Old Telephone Systems (POTS).

The monitoring system that includes the control panel 111 includes one or more sensors or detectors. For example, an alarm system may include multiple sensors 120 and 122. The sensors 120 and 122 may include a contact sensor, a motion sensor, a glass break sensor, or any other type of sensor included in a monitoring system, an alarm system or a security system. The sensors 120 and 122 also may include an environmental sensor, such as a temperature sensor, a water sensor, a rain sensor, a wind sensor, a light sensor, a smoke detector, a carbon monoxide detector, an air quality sensor, etc. The sensors 120 and 122 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the sensors 120 and 122 may include a radio-frequency identification (RFID) sensor that identifies a particular article that includes a pre-assigned RFID tag. In addition, the sensors 120 and 122 may include a video/photographic camera or other type of optical sensing device configured to capture images and may include an energy consumption sensor for appliances and devices in a property monitored by the monitoring system.

The sensors 120 and 122 communicate with the controller 112 over communication links 124 and 126. The communication links 124 and 126 may be a wired or wireless data pathway configured to transmit signals from the sensors 120 and 122 to the controller 112. The sensors 120 and 122 may continuously transmit sensed values to the controller 112, periodically transmit sensed values to the controller 112, or transmit sensed values to the controller 112 in response to a change in a sensed value.

The controller 112 may receive signals from the sensors 120 and 122 and detect an event based on the sensed values. For example, the sensor 120 may be a contact sensor provided on a door to a residence and the communication link 124 may be a wireless connection between the sensor 120 and the controller 112. In this example, the sensor 120 may sense that the door has been opened (e.g., absence of a connection between contacts included as part of the sensor) and wirelessly transmit data over communication link 124 to the controller 112 indicating that the door has been opened. The controller 112 receives the data from the sensor 120 over the communication link 124 and determines that an alarm event (e.g., the door opened) has occurred based on the signal from the sensor 120. The controller 112 controls operation of the alarm system based on the determination that the alarm event has occurred.

The monitoring system also includes a speaker 130. The speaker 130 may include an electromechanical transducer that converts an electrical signal into sound. The speaker 130 may receive an electrical signal from the controller 112 and produce an audible output based on the electrical signal. For example, the controller 112, in response to detecting an alarm event, may send a signal to the speaker 130 to cause the speaker to produce an audible alarm sound. The speaker 130 also may output audio messages (e.g., audio advertisements, broadcast audio alerts, etc.). In another example, the controller 112 may send a signal representative of a voice communication to the speaker 130 to cause the speaker to produce an audible output of the voice communication.

The monitoring system also includes a display 132. The display 132 may be any type of electronic display configured to render a visually perceivable display of information (e.g., an LCD display, a plasma display, a television, a computer monitor, a digital picture frame, a display integrated into an appliance, a display included in a portable device of a user, a mirror, a projection display device, etc.). The display 132 may be integrated in the control panel 111 or may be separate from the control panel 111 (e.g., a separate display provided as part of the security system or a television, a computer monitor, etc. that is not part of the security system, but a device with which the security system may communicate). The display 132 may be used to depict the current state of the monitoring system. For example, an LCD display may display words like "System Disarmed 6:42 pm", or "Enter User Code to Disarm", or "Front Door Opened". The display 132 also may be used to display electronic content, such as advertisement content, news content, weather content, and entertainment content.

The control panel 111 communicates with the speaker 130 and the display 132 over communication links 134 and 136. The communication links 134 and 136 may be similar to the communication links 124 and 126 described above.

The control panel 111 communicates with modules 140 and 142 to control and/or monitor other devices in a building. The module 140 is connected to one or more appliances, is configured to monitor energy consumption of the one or more appliances, and is configured to control operation of the one or more appliances. The module 140 may directly measure energy consumption of the one or more appliances or may estimate energy consumption of the one or more appliances based on detected usage of the one or more appliances. The module 140 may communicate energy monitoring information to the control panel 111 and may control the one or more appliances based on commands received from the control panel 111.

The module 140 also is connected to one or more lighting systems, is configured to monitor energy consumption of the one or more lighting systems, and is configured to control operation of the one or more lighting systems. The module 140 may directly measure energy consumption of the one or more lighting systems or may estimate energy consumption of the one or more lighting systems based on detected usage of the one or more lighting systems. The module 140 may communicate energy monitoring information to the control panel 111 and may control the one or more lighting systems based on commands received from the control panel 111. Although the module 140 is shown as being connected to both one or more appliances and one or more lighting systems, two separate modules may be used, a first module connecting to one or more appliances and a second module connecting to one or more lighting systems.

The module 142 is connected to a thermostat, is configured to monitor temperature and/or energy consumption of a temperature regulation system associated with the thermostat, and is configured to control operation of the thermostat. The module 142 may directly measure energy consumption of the temperature regulation system associated with the thermostat or may estimate energy consumption of the temperature regulation system associated with the thermostat based on detected usage of the temperature regulation system associated with the thermostat. The module 142 may communicate temperature and energy monitoring information to the control panel 111 and may control the thermostat based on commands received from the control panel 111.

The modules 140 and 142 communicate with the controller 112 over communication links 144 and 146. The communication links 144 and 146 may be a wired or wireless data pathway configured to transmit signals from the modules 140 and 142 to the controller 112. The modules 140 and 142 may continuously transmit sensed values to the controller 112, periodically transmit sensed values to the controller 112, or transmit sensed values to the controller 112 in response to a change in a sensed value.

The monitoring server 160 is an electronic device configured to provide monitoring system control by exchanging electronic communications with the control panel 111 over the network 105. For example, the monitoring server 160 may be configured to monitor events generated by the control panel 111. In this example, the monitoring server 160 may exchange electronic communications with the network module 114 included in the control panel 111 to receive information regarding alarm events detected by the control panel 111.

The monitoring server 160 may store sensor data received from the monitoring system and perform analysis of sensor data received from the monitoring system. Based on the analysis, the monitoring server 160 may communicate with and control aspects of the control panel 111.

The monitoring server 160 may operate a script builder. As such, the monitoring server 160 may enable developers to define and test rules to be deployed and executed by the interpreter included in the controller 112. After rules have been defined using the monitoring server 160, the monitoring server 160 may communicate a monitoring script over the network 105 to the network module 114.

The network module 114 may receive rules definition information from the monitoring server 160 and store the rules definition information in memory (e.g., flash memory) included in the control panel 111. The interpreter may implement the rules defined by the rules definition information, as described throughout this disclosure. Rules may be remotely defined, sent to the network module 114, and used to control any of the devices described throughout this disclosure and react to any of the sensors and/or input devices described throughout this disclosure. Any operations of the control panel 111 (and other components of the monitoring system) may be controlled by rules provided to the interpreter.

For instance, in some examples, the interpreter may be used to control lighting systems included at the monitored property. In these examples, the interpreter may be able to implement rules that control zwave lights and perform sensor-light interaction functionality. Specifically, the system may control lights to provide simulation of human presence while the house is empty (e.g., vacation, going out at night . . . ), or when the house is occupied by a single person (e.g., elderly persons who stay in one room most of the time).

In some cases, people just leave most of their lights turned on to show that the house is occupied, which may waste energy. The monitoring system may perform the following operations, which may better simulate presence and save energy costs in doing so.

A user selects an "away lights mode" from a website or from a mobile application that controls the monitoring system. The selection starts a bunch of pseudo-random light schedules that simulate human presence in the house. The system also may start this mode automatically by detecting presence (or lack thereof) in the monitored property via motion sensor activity, and by looking at the armed state of the alarm panel. The initial setup may involve (a) selecting a few lights among all the zwave appliance modules available in the house, (b) selecting how long on average a light module will stay on, (c) selecting how many of the light modules should be on concurrently, and (d) selecting how often the light patterns should change. These simulation techniques may tie a security system with an automation system. Not only does the system protect the house via the panel detection capability, but the system also keeps burglars at bay. Not to mention the energy savings resulting from not having to burn lights continuously for long periods of time.

In some implementations, the monitoring system may monitor how lights (or other controlled appliances) are typically used when the property is occupied. In these implementations, the system may determine patterns of use that are typical when the property is occupied and simulate presence when the property is not occupied by controlling the lights (or other controlled appliances) based on the determined patterns (e.g., by repeating the patterns of light usage for appropriate periods of time).

Thus, the monitoring system 200, employing the interpreter, may allow customers to set more flexible responses to known events via a website or via a mobile device application. For instance, an entry sensor opening on weekday mornings may trigger an email message sent to the customer on behalf of the monitoring system by the monitoring provider. Such an instruction or "rule" is typically sent by the provider to the monitoring system via a wired or wireless communication method, as a set of parameters that modify a pre-programmed behavior in the monitoring system. For instance, the rule may enable a behavior such that "if sensor X opens on day Y between time A and B, then send message M to recipient Q." By sending different sets of (X, Y, A, B, P, Q) parameters, the monitoring system can be customized to some extent, but the underlying logic tying the events, the time and date at which they occur, and the action is fixed. The system can be further customized in subsequent versions by adding flexibility in areas that were fixed in prior versions. For instance, in the rule example above, the sensor X opening event can be generalized to any appropriate type of event that the monitoring system can detect, yielding more general rules such as "if event K occurs on device X on day Y between time A and B, then send message M to recipient Q", where "event K" can be defined as a sensor opening, but also as a panel arming or disarming event, or as an alarm tripping to name a few examples.

For brevity, the monitoring server 160 is shown as communicating with one control panel 111. However, in some implementations, the monitoring server 160 may communicate with and control more (perhaps many more) monitoring devices.

Figure 3:
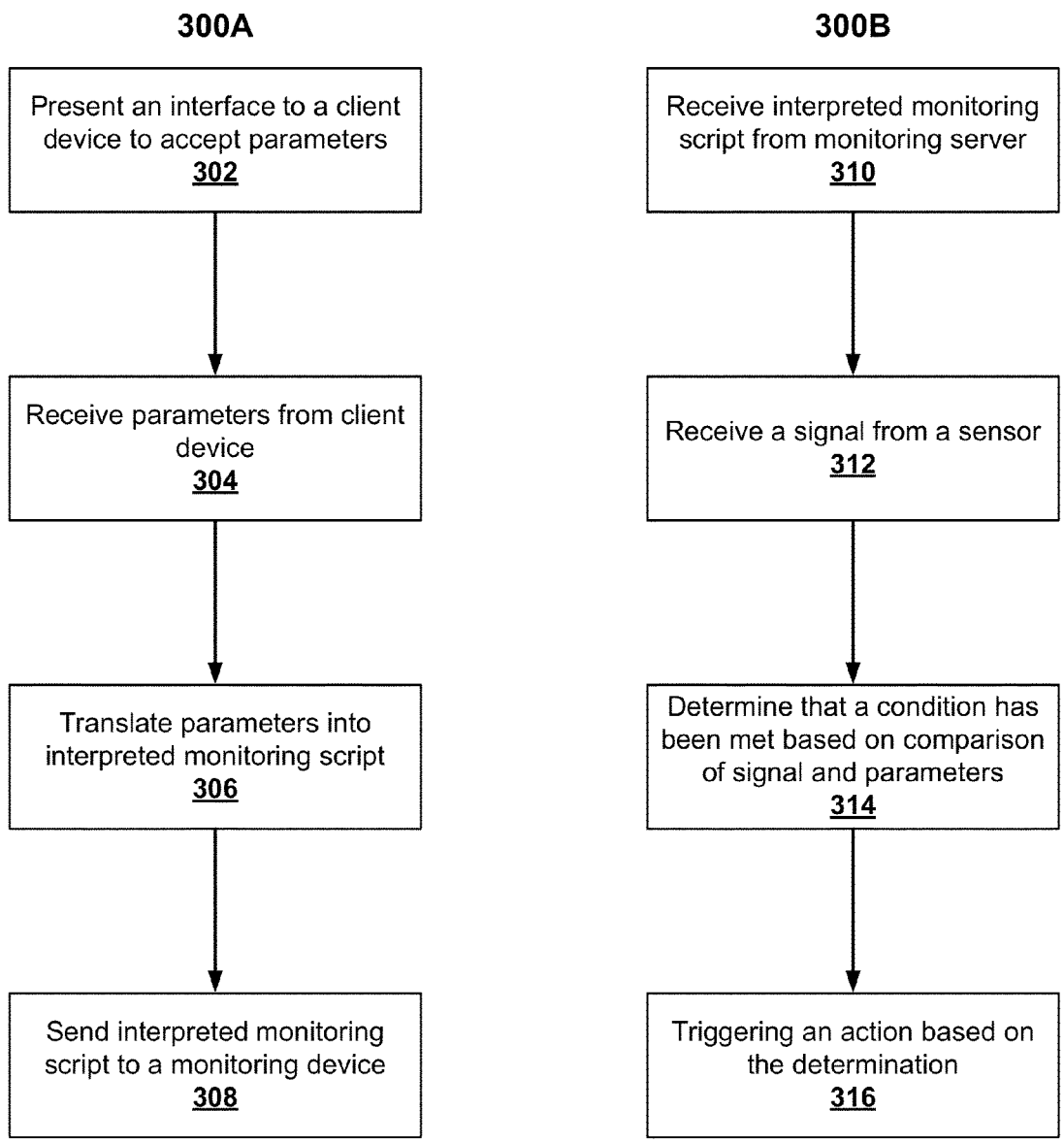
FIG. 3 illustrates example processes 300A and 300B for creating and sending a monitoring script to a monitoring device.

FIG. 3 illustrates example processes 300A and 300B for creating and sending a monitoring script to a monitoring device. For simplicity, processes 300A and 300B will be described with regard to the monitoring system shown in FIG. 1. For example, process 300A may be performed at the monitoring server 107 and process 300B may be performed at the control panel 104. However, the processes 300A and 300B may be performed on any adequately configured monitoring system or monitoring device.

Process 300A begins when the client device 108 initiates communication with the monitoring server 107. In response to the initiation of communication, the monitoring server 107 presents an interface to the client device 108 (302). The interface enables a user to create a monitoring script for use in the user's monitoring system 100. Specifically, the interface is configured to accept one or more parameters provided by the user. In some implementations, the one or more parameters are variables that may be used to customize a monitoring instruction template, as will be described in greater detail with regard to FIGS. 4 and 5. In other implementations, the one or more parameters provided by the user are terms in a programming language used by the user to flexibly define a monitoring instruction.

In some implementations, the interface provided to client device 108 may be one or more webpages. In other implementations, the interface provided to client device 108 may be a stand-alone application running on the client device. However, the interface may take any form through which parameters may be specified by a user of the client device.

Moreover, the interface provided to client device 108 may be customized in various manners. For example, as will be described in greater detail below with regard to FIG. 5, the interface may be customized based on the configuration of a monitoring system associated with the user of the client device 108. Alternatively or additionally, the interface may be customized based on a subscription-level of the user of the client device.

The monitoring server receives the one or more parameters from the client device (304). The monitoring server translates the one or more received parameters into an interpreted monitoring script (306) and sends the interpreted monitoring script to a monitoring device (308). The interpreted monitoring script represents one or more monitoring instructions or "rules". In some implementations, these rules may take on the basic form: if X, then Y. In these implementations, the parameters received from the client device may be used to define X and Y. For example, a rule may specify that "if the camera detects motion between hours X, then the camera will take a picture and send it to Y." However, the rules are not limited to this basic format and may include any combination of loops, variables, conditional statements, and any other logical constructs, as will be discussed in greater detail below.

The monitoring server 107 may automatically translate the rule into a monitoring script. However, in some implementations, the translation process may require the input of one or more programmers at the monitoring server 107. In the case where the monitoring server 107 automatically translates the rule, the monitoring server 107 may translate the user input into statements of an interpreted monitoring script that are indirectly executed by the interpreter in the control panel 104. For example, as set for above in FIGS. 1A-1E, a user may select a rule that turns off all lights 101 connected to the control panel 104, if all sensors are inactive for two hours. The monitoring server 107 may translate this rule into an interpreted script that is interpreted by the interpreter in the control panel 104. In some implementations, the monitoring server 107 may automatically translate the above-described rule into the following pseudo-code:

```
int n = numberOfSensors( );
array sensor;
startTimer( );
while(time<120){
    sensor = getAllSensors( );
    for (x = 0; x<n; x++) {
        if (sensor[x].isStateChange( )) {
            resetTimer( ); } } }
turnOffAllLights( );
```

Moreover, to create monitoring scripts, the monitoring server 107 may require information regarding the monitoring devices to which the monitoring scripts are to be sent. In order to determine this information, the monitoring server 107 may be configured to access account information associated with a user and determine the configuration of a monitoring system associated with the user. Based on the accessed configuration and the rule that the user selects, the monitoring server 107 may determine to which monitoring devices to send the script.

For example, if the monitoring system includes a control panel, two cameras, and a motion sensor, and the rule selected by the user is specific to a camera (e.g., a rule that requires a picture to be taken), the monitoring server 107 may use information about the two cameras included in the accessed account information in determining how to translate the rule into a script for the cameras. Moreover, the monitoring server 107 may determine address information associated with the two cameras in order to send the resulting script to the cameras. Additionally or alternatively, the monitoring server 107 may use the information included in the accessed account information to determine that the script should be sent to one camera and not the other camera. In some implementations, the monitoring server 107 may accept information regarding the configuration of a monitoring system or multiple monitoring systems from the user. When the user owns multiple monitoring systems, the monitoring server 107 may determine whether a monitoring script should be sent to an appropriate monitoring device in all of the multiple monitoring systems or a subset of the multiple monitoring systems. Based on the determination, the monitoring server 107 uses address information to the send the monitoring script to one or more appropriate monitoring devices in one or more of the multiple monitoring systems.

In some implementations, rules exist in the context of events, triggers, and actions. Specifically, rules may determine what actions should be taken in response to an event that satisfies a trigger: Events→Triggers→Rules→Actions.

Events can be anything that the monitoring system, or its sensors, can generate, such as, but not limited to sensor opening, closing, alarms, panel arming, message receipt, etc. Triggers are the link between events and rules. Rules may be executed in response to certain sensor, panel, zwave, or schedule events. Triggers are what determine which event invokes which rule. In some implementations, a trigger acts as an interrupt within the monitoring device to cause the monitoring device to analyze the signals received by the monitoring device with respect to one or more rules associated with the trigger.

For example, in the case where a monitoring device receives signals from multiple sensors, an event may be a change in state related to any of the multiple sensors. A trigger may define a specific type of change in state; for example, any door opening. Such a trigger acts as an interrupt within the monitoring device to cause the monitoring device to evaluate any rules associated with a door opening. One rule may state that a certain action shall be taken if the front door opens and the system is armed. The action may be to send alarm messages to the monitoring server and to a user's cell phone. Thus, when the front door in the house opens, the "any door opening" trigger causes the monitoring device to evaluate the rules associated with a door opening. The monitoring device would determine that one rule specifies an action when the front door is open and the system is armed. Therefore, if the monitoring device also determines that the system is armed, the monitoring device will send alarm messages to the monitoring server and to a user's cell phone.

Rules may be sequences of instructions, similar to instructions that may be found in any programming language, together with variables, registers, a stack, etc. Instructions include Boolean instructions, math, jump, control flow, store, retrieve, etc. Rules and triggers are the dynamic part of an interpreter. They can be uploaded and stored into a monitoring device (e.g., over the air through a wireless communication channel). In some implementations, events and instructions may be the static part of the interpreter. They may be designed into the monitoring device during the development phase.

In some implementations, an interpreter is, itself, an interpreted programming language. The interpreter may include a set of instructions (e.g., about one hundred instructions), similar to instructions that may be found in other computing languages such as C, Visual Basic, or assembly language. Instructions include loops, tests, function calls, variable assignments, math, timekeeping, etc. There are volatile and non-volatile variables, registers, and a stack. The script is a collection of rules that can be executed separately, or that can call each other. Rules may be uploaded remotely (e.g., over the air though a wireless communication channel), and are stored in flash (or other) memory in a monitoring device of a monitoring system (or another type of security or monitoring panel).

Rules can be executed via backend commands (i.e., commands sent from the monitoring server telling the monitoring device to execute one or more rules). However, in most cases, rules are executed in response to panel events or in response to timing events. The interpreter is "plugged in" to the monitoring device in such a way that any sensor, arming, alarm, trouble, or any potential event of interest can be used to trigger one or more rules. Rules can in turn cause certain actions on the monitoring device, on a Zwave device, or on the monitoring server itself. When a rule is developed, the developer specifies which event(s) should trigger the rule, if any.

Process 300B begins when a monitoring device receives the interpreted monitoring script from the monitoring server (310). The monitoring device may receive the interpreted monitoring script in real-time as the script is translated at the monitoring server or the monitoring device may receive the interpreted monitoring script during periodic or aperiodic updates sent to the monitoring device. Once received, the monitoring device stores the monitoring script in a memory or storage device.

Figure 6:
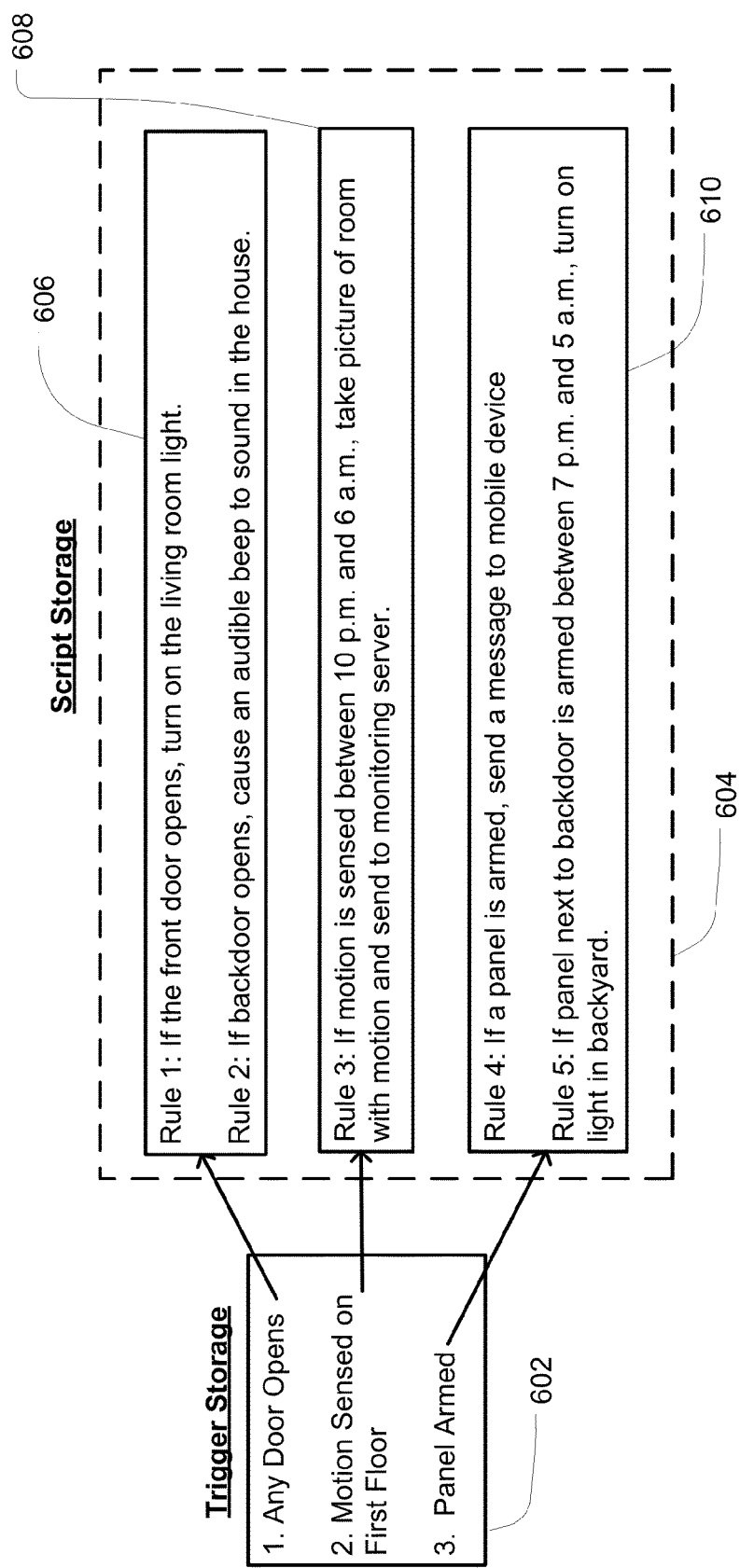
FIG. 6 illustrates an example of a storage structure for storing triggers and monitoring scripts.

A trigger associated with a received script may be received simultaneously with the script or received separately, as described above. In some implementations, the monitoring script may be stored separately from the triggers, as shown in FIG. 6. For example, the triggers may be stored in a first structure or memory 602 and the rules may be stored in a second structure or memory 604. As described above, the triggers may act as interrupts. Thus, when one of the triggers is set off, it may cause one or more corresponding scripts to be executed by the monitoring device. For example, the first trigger may be linked to a first set of scripts 606 that are associated with the first and second rules. Thus, when the first trigger is set off, the first and second scripts are executed. Similarly, the second trigger may be linked to a second set of scripts 608 that are associated with the third rule and the third trigger may be linked to a third set of scripts 610 that are associated with the fourth and fifth rules.

After the receiving the interpreted monitoring script, the monitoring device may receive a signal from a sensor connected to the monitoring device (312). As described above, the monitoring device may then employ triggers to determine when to execute the monitoring script. However, the monitoring device need not employ triggers. For example, in some implementations, the monitoring device may execute the monitoring script as part of a loop and, thus, continuously evaluate the one or more rules included in the monitoring script. In any case, execution of the monitoring script results in a comparison between the received signal and the parameters included in the monitoring script.

The monitoring device may determine that a condition specified by the received interpreted monitoring script has been met based on a comparison between the received signal and the parameters included in the received interpreted monitoring script (314). In other words, execution of the monitoring script causes a determination to be made whether the received signal satisfies parameters included in a rule of the monitoring script (e.g., the condition of the rule). If the condition of the rule is met, then the monitoring device triggers an action associated with the rule of the monitoring script (316).

In some implementations, the action prompted by a condition in a rule may be an action that concludes the current instance of the script's execution. For example, the action may be to send a message to the monitoring server 107 or to another monitoring device. Additionally or alternatively, the action may cause, for example, a siren to sound, a picture to be taken, an appliance to be turned on/off, a lock to be engaged/disengaged, or a call to be made to an authority or emergency contact. However, in some implementations, an action or a condition may require further processing. For instance, some rules may include a condition that requires a timer. A rule may state: if a door is open for five minutes, send an alert to a particular mobile device. The trigger for this rule would be any door opening. However, the condition of the rule requires execution of a timer in order to be fully evaluated. Therefore, in some implementations, the script associated with the above-described rule may create a new timer trigger and then pause the script's execution. The timer trigger is a special trigger that is created by an instance of a script being executed and then is deleted once the scripts execution completes. In this example, the timer trigger runs for five minutes and then triggers the script associated with the rule, notifying it that five minutes have elapsed. The script associated with the rule determines whether the door has continued to stay open, and if it has, the script causes a message to be sent to the mobile device.

In some implementations, the rules included in a monitoring script may be based on rule templates. Specifically, the provider of the monitoring system may create rule templates that a user of the monitoring system may than base their rules upon. Rule templates may be associated with specific monitoring devices and may be based on the specifications of the associated monitoring device. The monitoring server may employ such rule templates to ensure that users are provided with an intuitive interface for creating new rules. Moreover, rule templates may be used to prevent the users from attempting to create new rules that are not supported by the specifications of a user's monitoring device.

Figure 4:
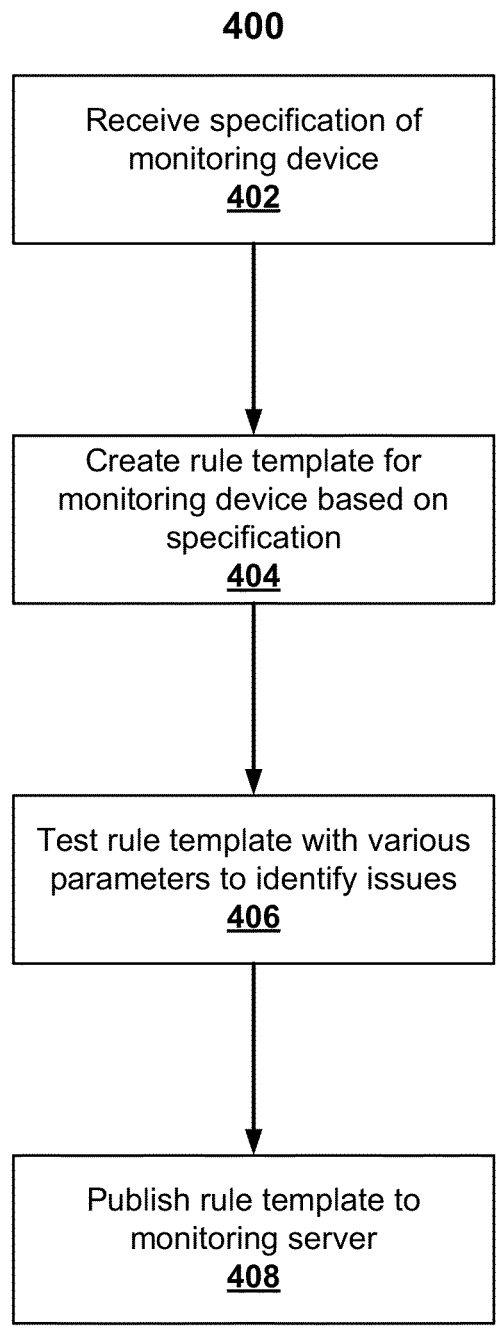
FIG. 4 illustrates an example process 400 for creating a rules template.

FIG. 4 illustrates an example process 400 for creating a rule template. In some implementations, the rule templates may be created by an administrator associated with the monitoring server. In other implementations, the rule templates may be created automatically by the monitoring server. For convenience, process 400 will be described as though the monitoring server automatically creates the rule templates. However, the same or a similar process may be utilized by any entity to create a rule template.

Initially, the monitoring server receives specifications for a monitoring device (402). The specifications may be received in various manners. For example, the specifications may be received from the manufacturer of the monitoring device, the specifications may entered by an administrator associated with the monitoring server, or the specifications may be received from a user of a client device associated with the monitoring device. Moreover, the specifications may be received in a predefined format or the monitoring server may include a parser and/or interpreter for analyzing specifications in any format in which they are received.

Received specifications may, for example, indicate a category of the monitoring device, a brand of the monitoring device, a serial number of the monitoring device, and/or monitoring functions associated with the monitoring device. Moreover, the specifications may describe the capabilities and/or limitations of the monitoring device. For example, the monitoring device may be of a camera type and the monitoring device may be capable of video, still capture, and motion tracking. However, the camera may be limited to capturing visible light, so it may not be capable of capturing images at night.

The monitoring server is configured to create one or more rule templates for the monitoring device based on the received specifications (404). A rule template may, for example, specify a list of conditions that the monitoring device is capable of detecting and a list of actions that the monitoring device is capable of taking, according to the received specifications. For example, if the monitoring device is the camera described above, the monitoring server may determine that the monitoring device is capable of detecting motion as a condition. Therefore, the monitoring server may create a rule template that includes a condition of "motion has been detected" as an option for a user to select.

Once a rule template has been created, the monitoring server may test the rule template in a virtual environment (406). In order to ensure that a rule template will not cause problems for a user, the monitoring server may include a virtual environment in which to test the rule templates. A virtual environment is a virtual representation of one or more monitoring systems that include more or more monitoring devices. The virtual environment simulates the reactions of actual monitoring devices in actual monitoring systems, by emulating the functionality of the monitoring devices on the monitoring server and feeding various test signals to the emulated devices. If the rule passes tests in the virtual environment, the monitoring server may publish the rule template and allow users to apply the rule template in their monitoring systems (408).

The monitoring system may not make all rule templates available to all users. For example, the monitoring system may limit the number of rule templates to which a user may have access depending on the level of a user's subscription or membership. For example, the monitoring server may be configured to differentiate between users that have paid different amounts for membership to the monitoring server's services. Thus, a user paying a higher amount for a subscription may have access to more rule templates. Moreover, the monitoring system may prevent users from interacting with rules templates associated with devices that the user does not own, so as to simplify a user's selection process.

Figure 5:
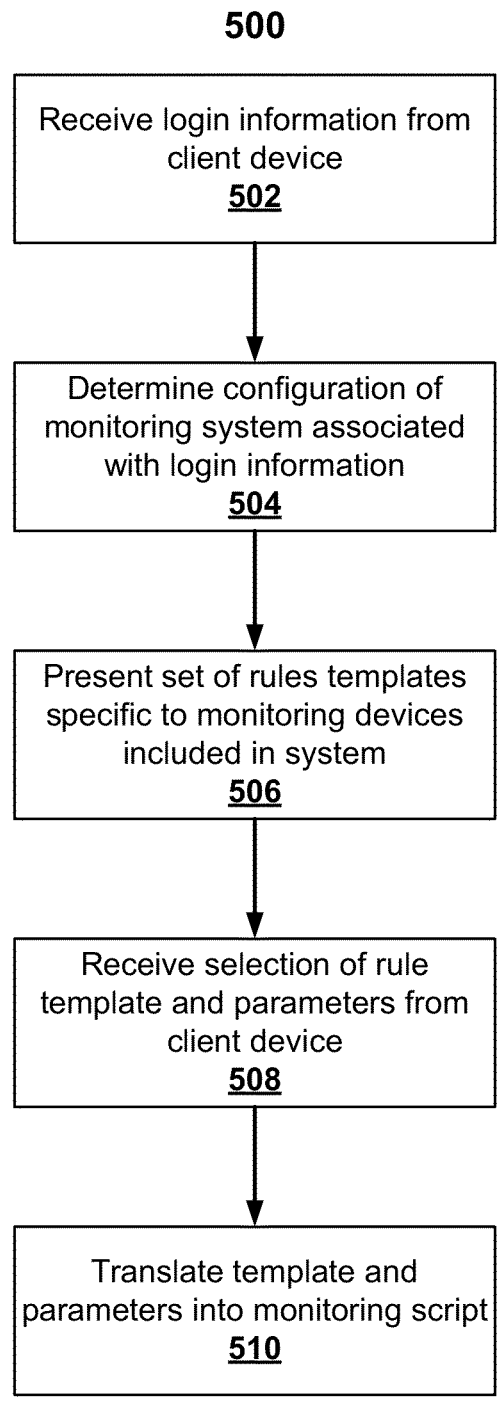
FIG. 5 illustrates an example process 500 for presenting a subset of rule templates to a user to create a monitoring script.

FIG. 5 illustrates an example process 500 for presenting a subset of rule templates to a user to create a monitoring script. Initially, the monitoring server receives login information from a client device (502). The monitoring server may, for example, receive this login information as part of presenting an interface to the client device in operation 302 of FIG. 3. The monitoring server stores login information for all users that have monitoring systems connected to and/or registered with the monitoring server. Thus, when the monitoring server receives the login information, the monitoring server determines whether the login information is authentic by attempting to match the login information to a user registered with the monitoring server.

If the login information matches a user that has a monitoring system connected to and/or registered with the monitoring server, the monitoring server determines the configuration of the user's monitoring system (504). For example, the monitoring system may determine how many and what types of monitoring devices the user has in her monitoring system and where those monitoring devices are located within the user's property. In some implementations, the monitoring system may also determine a level of the user's membership with the monitoring server.

Based on the determined configuration of the user's monitoring system, the monitoring server may present the user with a set of rule templates specific to the monitoring system's configuration (506). For example, if the user only has entry sensors in her monitoring system, the monitoring server will only present rule templates that are associated with entry sensors. Moreover, the monitoring system may further limit the rules templates presented to the user to correspond with the model, location, and/or status of the monitoring devices included in the user's monitoring system. Additionally, the monitoring server may limit the rules templates presented to the user based on the level of the user's subscription to the monitoring server.

The monitoring server receives a selection of a rules template from the user, as well as the parameters needed to complete the rules template (508). Once the user has made the necessary selections and/or provided the necessary input, the monitoring server translates the template and received parameters into an interpreted monitoring script (510). The monitoring server may translate the template and received parameters in the manner described above with regard to operation 306 of FIG. 3.

Following are more detailed descriptions of various types of rules and triggers, as well as their associated format.

An example of a rule may be for "sensor left closed." This functionality may be hardcoded in the monitoring device's firmware, but hardcoding may be difficult to change and update. This functionality is used mainly for monitoring medicine cabinets and special sensors mounted on pill dispensers. It alerts care providers or relatives if the customer has not taken his/her medicine. In an example hardcoded implementation, the "sensor left closed" rule may have the following parameters and limitations:

Sensor # (the sensor that is monitored)
Day(s) of week that the sensor will alert if it is not open
Times of day that the sensor will alert if it is not open
Arming state of the panel (you may not want to alert if the panel is armed away)
Length of time the sensor has to be open for
Limitation #1: Cannot combine the opening/closing patterns of two or more sensors
Limitation #2: Will not work on motion sensors
Limitation #3: Will not alert again until the monitored sensor opens again
Limitation #4: Will not alert if the sensor opens too many times (as in the customer is taking too many medications)

In a traditional monitoring system, fixing limitations 2 and 3 would have been fairly simple, but would have required a new production firmware. Limitations 1 and 4 would have required new firmware and a much more complicated way of specifying the parameters of the command in order to support a wide variety of cases involving complex interactions between sensors (limitation 1) or complex timing sequences (limitation 4). Most of all, it would require very time consuming and extensive testing before release in order to check every possible situation, involving all possible sets of parameters.

The interpreter may reduce all of these limitations and need for extensive testing. For example, a rule could be written that checks not only that the pill dispenser has been open once only during a specific time period in the day, but it can also check that there is activity in certain parts of the house to avoid alerting if no one is home. If a camera is used, the rule can tell the camera to take an image or clip when the pill dispenser is opened to verify that the correct medicine was taken. Once the interpreter itself has been validated, there is no need for testing every possible rule. Each new rule is tested prior to being deployed by the monitoring server, which could be months after the monitoring device itself has been released.

Here is another example of a rule that may be used for a dealer who sells mostly Wireless Forwarding accounts (i.e. accounts for which we do not receive sensor open/close or panel arming/disarming events at the backend). The dealer may want to know how many of their customers arm their panels, and how often, to see if and how arming the panel correlates to account retention. A rule may be sent to all of the dealer's customers who have a control panel that includes a GSM module and the interpreter. The rule does the following:

Each time the panel arms or disarms, save the date and time, as well as the level of arming in an array.
If the array is full, send the contents of the array to Alarm.com, and empty the array
If seven days have elapsed since the last dump, send the contents of the array to Alarm.com and empty the array In another example, a remote/wireless siren may be supported. For instance, a Zwave siren may be used and a rule may be developed that would monitor the alarm state of the panel, the type of the alarm, and that could generate a close-enough sound pattern on the Zwave siren when needed. The rule could also control flashing of Zwave lights if desired.

As described above, the rules and rules templates may be developed and tested by a backend team using a special IDE (Integrated Development Environment). In some implementations, the IDE allows users to create and edit Rules, as well as simulate their execution by a monitoring device for debugging purposes. Once a rule is working, the rule is sent to a test panel to confirm that it works as well as in the simulation. Once the rule is validated, the rule may be deployed in the backend. In most cases, the rule may be tied to a specific page of a website. When a customer who has a monitoring device with an interpreter goes to that page and uses the functionality supported by the rule, the rule may be sent to his system with whatever parameters are specified by the rule, and are specific to the customer's system.

Other example uses of the interpreter, of the monitoring server, and the website are described below. The following examples may be used in some implementations but may not be used in other implementations. For all of the examples below, the rule may allow the user to specify days of the week or times of the day when the action takes place or does not take place.

Locks/Arming Monitoring Devices
If a user unlocks the Front Door, disarm the security panel.
If the Back Door is locked, Arm Away the security panel.
If the security panel is armed to Arm Away, lock All Doors.
If the Front Door is locked, lock the Back Door and Utility Door.
If the Back Door is left unlocked for thirty minutes, re-lock it.

Lights

If the Front Door is opened, turn on the Hall Light and leave it on for ten minutes.

If the panel is Armed Away, turn off All Lights.

If there is an Alarm, turn on All Lights.

Thermostats

If any window sensor is left open for three hours, turn off the thermostat and send a text message notification.

If the system is Armed Away, turn off the thermostat schedules until it is disarmed again.

Image Sensor Monitoring Devices

If the image sensor is "armed", capture an image anytime the front door opens. Sirens/Alarms If there is an Alarm, turn on the Z-Wave Siren until the system is disarmed OR until 4 minutes later.

Scenes & Other Special Rules

If the Back Door is unlocked, trigger "Coming Home" Scene (Turn on Hallway Light; Change thermostat Target Temp to seventy-two degrees; and Turn on Stereo System.), and then three hours later trigger "Ready for Bed" Scene (Turn off downstairs lights; Turn off Stereo)

If all sensors are inactive for two hours, turn off All Lights.

If the system is armed and the back door is unlocked, flash lights on and off ten times.

If the system is disarmed by the Cleaning Service but not re-armed within two hours, send an email notification.

All of the example rules may be defined and changed remotely by the monitoring server, and the interpreter may be used to execute the current rules. For instance, the monitoring server may change parameters of rules for a monitoring system, may turn on or turn off various rules, and/or define timing schedules for various rules. The interpreter at the monitoring system is then able to execute the current set of rules based on any of the changes made by the monitoring server, which may enable relatively quick and easy changes to monitoring system configurations.

Accordingly, in some implementations, an interpreter provides a flexible way to customize a monitoring device in order to fit a specific application. Rules and triggers can be sent over the air to any monitoring device of the proper version. Triggers define which rule(s) will be executed in response to specified sensor or panel events.

The monitoring server may implement the interface presented to the client device as a Rules Builder, which is a visual point-and-click program that guides the user in creating rules and triggers. It is also used to simulate the events that trigger the rules in the modules during the debugging phase of rules building.

The Rules Builder may be used by firmware developers to test the implementation of the Rules Engine in the monitoring device's firmware. It also may be used by Web developers to generate rules templates that will be turned into actual rules as customers and dealers click on some of the new Advanced Interactive pages of a monitoring company's web site. Additionally, the Rules Builder can be used by trained support personnel of the monitoring company to prototype certain applications for selected dealers or customers.

An interpreter may be a set of instructions and code that executes those instructions within the monitoring device's firmware. The same code may be used by the Rules Builder to simulate the execution of a rule during the creation phase.

A rule may be a series of instructions with parameters and control flow that define a certain action in response to a certain event.

An instruction may be a basic command that tells the interpreter what to do next as it executes a rule. Instructions may have one or two arguments that further define what that next action will be.

A program may be the set of all the monitoring scripts that have been sent to a monitoring device. The rules represented by the monitoring scripts may be stored by the monitoring device in flash memory so that they can be loaded into a program memory of the monitoring device at boot time, or any time a new rule is received. The program itself may never be executed as a whole. Instead, rules may be executed separately in response to events, or they can be called by other rules.

A stack included in the monitoring device may be a staging area used for calculations, decision making, building messages or commands. The stack may be made up of 100 32-bit signed variables. A group of instructions may be used to put values at the top of the stack (push), or to take values from the stack to make up messages or commands. The last element pushed onto the stack is called S1.

Variables may include 300 32-bit signed variables that are available to store intermediary values, to create timers, or to receive the parameters of the event that triggered the rule. A group of instructions may be used to transfer the values in variables to the stack for calculations and/or decision making, and vice versa.

A trigger may define what rule will be executed by the monitoring device in response to events. The parameters of a trigger can be as narrow as "execute rule X if the panel is armed stay by user 3" or as wide as "execute rule X if the panel arming level changes for any reason". The triggers, and the rule(s) that they execute may be sent in a single command to the monitoring device. These commands may be generated by the Rules Builder.

A timer may be a specific type of trigger that executes a rule at the end of a specified interval of time. Unlike other triggers, a timer can be defined on the fly by a rule, and does not need to be part of the command that sends the rule to the monitoring device. On the fly timer definition may be used when the timer is used sporadically, and in response to other events.

In some examples, the Rules Builder stores every rule and trigger it creates in a rules text file and a triggers text file. In these examples, the two files get loaded every time the Rules Builder program is started. If user input is received to create a new rule or if user input is received to edit an existing rule, the changes may be saved at any time. A title may be entered to identify the rule. The following description sets forth examples of various processes that may be employed by some implementations of the Rules Builder.

1. Creating a New Rule

A new rule may be created, and, then, instructions are inserted for the new rule.

2. Saving the New Rule

In some implementations, the new rule needs to be saved before it can be executed and debugged. The rules program file may be saved regularly to archive old rules or to recover a rule that was deleted or replaced by mistake.

3. Executing and Debugging the New Rule

Once the rule is saved, it can be executed and debugged.

4. Triggering a Rule by Simulating an Event

In some implementations, when an event trips a trigger, which in turn executes a rule, all the usable information about that event will be loaded in variables that the rule can make decisions against.

Rules are executed by the monitoring device in response to events. The Rules Builder may simulate events and triggers that will respond to these events by executing rules.

4.1 Simulate a Sensor Event

In some examples, at least one rule needs to be created and saved before you can simulate an event. You can write a very simple rule with one instruction, and then once the event is simulated and the variables are loaded with the event's specific data, you can edit the rule and add all the necessary logic to process the event.

All event type simulations may work in the same way. This example can be extrapolated to other event types.

4.2 Create a Sensor Event Trigger

In some implementations, before you can simulate an event, you must define a trigger. Triggers need be defined once only. They get saved automatically in the trigger text file, and are loaded automatically when the Rules Builder program starts.

A user can define a trigger that trips for a specific sensor or for any sensor. For any sensor, a user may leave a sensor drop down menu in the Rules Builder program to "Any sensor". Next, the user may select the rule that will be executed by the trigger. Then the user may select the type of event that will trip the trigger, for example:

- Sensor opens or closes: The trigger will trip if a (the) sensor opens or closes
- Sensor opens: The trigger will trip only if a (the) sensor opens
- Sensor closes: The trigger will trip only if a (the) sensor closes
- Sensor state bit changes to ON: the trigger will trip if a trouble, alarm, low battery, tamper occurs on a (the) sensor. To specify which one, select the appropriate state check box.
- Sensor state bit changes to OFF: the trigger will trip if a trouble, alarm, low battery, or tamper restore occurs on a (the) sensor. To specify which one, select the appropriate state check box.

4.3 Simulate a Sensor Event

In some examples, a specific sensor and a specific event is selected in order to simulate an event—even if the trigger was defined for any sensor. The event may be simulated to trip the trigger. If the event and the trigger are of the same kind, the rule specified will start executing.

4.4 Completing and Testing the Rule

With the variables loaded with event information, a developer may finish the rule and test it. In one example, the rule will turn light 3 on if sensor 10 is closed and it will turn light 3 off if sensor 21 is opened. Note that, if the trigger does not specify any sensor number, it will trip for any open/close event.

When a specific sensor and/or a specific open or close event is desired, it is recommended to customize the trigger to that sensor and/or that event so that the rule is invoked only for that sensor and/or only for that event. The rule itself will be simpler because it won't have to check which sensor and/or which event tripped it.

5. Send the Rule to a Monitoring Device

Once the rule is working in the simulator, it may be sent to a test monitoring device for actual field testing. In this regard, any of the rules described throughout this disclosure may be sent to a monitoring device in a monitoring system (e.g., a home security system) and an interpreter within the monitoring system may execute the rule and control operation of the monitoring system (or other devices) based on the rule.

Rules and triggers may be sent to the module one at a time or in groups of several rules. In some examples, the trigger(s) associated with the rule(s) are sent in a single command, since in general a rule may be inoperable without a trigger, and vice versa.

6. Loading Rules and Triggers into the Rules Builder Program.

One way to load third-party rules and triggers into the Rules Builder program is to input Rule Commands via an input mechanism provided in the Rules Builder program.

7. Forcing the Monitoring Device to Execute a Rule.

Generally rules are executed by triggers in response to sensor, panel, zwave, or any other event that can be defined as a trigger. A user can also execute a rule on demand by sending a command to the monitoring device.

8. Rule Execution Errors

The monitoring device may keep a list of the last 10 errors encountered while loading or executing rules. The monitoring device may send a list of errors every time a new error occurs. The last 10 errors can also be requested via a remote command.

The following description provides details regarding examples of different types of triggers that may be used in some implementations of the monitoring system.

When a rule is executed by a trigger, the trigger may store all the relevant information about the event in three or more variables.

1. Timer Triggers

A timer may be a variable that contains a time which, when reached, will cause a rule to execute. The time stored in the variable may be the number of seconds since power up. The Rules Engine compares the variable every few seconds against a master time. When the master time is greater than the number of seconds since power up, the rule associated with the timer trigger is called.

A timer trigger can be defined via an instruction within a rule, or can be sent to the module via a Rule Command.

2. Schedule Trigger

Schedules may be managed by a schedules engine included in the monitoring device. A schedule typically has a start time and end time, a days of the week during which it is active (and inactive the rest of the time), and sometimes an arming level for which it is active or inactive. There may be arming schedules, light schedules, inactivity schedules, SLO and SLC schedules, sensor-light interaction schedules, command schedules (zwave schedules), and generic schedules (schedules that do nothing other than transitioning from active to inactive and back at specified times and days).

A schedule trigger can trip when the schedule transitions from inactive to active state (e.g., the schedule starts), or from active to inactive (e.g., the schedule ends), or both.

Schedules may be used in conjunction with other types of triggers rather than as triggers themselves. For instance, a rule invoked by a sensor open/close trigger can check the state of a schedule (See GetScheduleStateByRef) to determine whether to continue executing the rule or not depending on whether the schedule is in its active state or not.

3. Sensor Open/Close Trigger

An open/close sensor trigger may trip when a sensor opens or closes, or both.

To handle several sensors with a single rule, set the trigger sub-type to 0 (any sensor), and filter the undesired sensors inside the rule.

An example of an open/close sensor trigger may be: "Do something only if sensor 3, or sensor 4, or sensor 9 opens."

4. Device State Change Triggers

Device state change triggers are similar to the sensor open/close triggers, but may be more generally applied. For instance, they may apply to sensors and partitions, and they cover any state change except open/close (sensor) and arming (partitions). Such state changes include alarms, troubles, low battery, bypass, entry delay, tamper, AC failure, Phone failure.

One type of device state change trigger trips when a state bit gets set (Device State Change ON trigger), and one that trips when the state bit get reset (Device State Change OFF trigger).

If a user wants to execute a rule when a trouble or alarm first occurs, the user may use a Device State Change ON trigger. If a user wants to execute a rule when a trouble or alarm is restored, the user may use a Device State Change OFF trigger.

5. Arming Trigger

Use these triggers to execute a rule when the panel, or a specific partition, is armed or disarmed.

6. ZWave Alert Trigger

This type of trigger invokes rules in response to broadcast by ZWave devices (nodes) that are either polled by the monitoring device regularly, or are associated with the monitoring device. A second requirement is that a ZWave Alert be defined for the node. To recap, three different elements may be defined for this type of trigger:

A ZWave Alert trigger

A ZWave Alert

Polling of the ZWave device by the GSM module, or an association between the device and the module.

7. ZWave Response Trigger

ZWave response trigger is similar to the ZWave alert trigger, except that it trips in response to a ZWave query from the module to a specific ZWave node. More specifically, it trips when the response from the node is received by the module.

Example of query that will elicit a ZWave response from a ZWave node: "read ambient temperature of ZWave thermostat node #3."

8. Outbound Message Trigger

Any message sent by the monitoring device to the monitoring server can be used to trigger a rule. This is useful in at least two cases:

When the event that caused the message is not supported by other trigger types. Since almost any event can lead to a message, almost any event can trip this trigger.

When the message is sent in response to a SendCommand instruction in a rule, and the rule wants to read what is in the message. For instance, a rule could send a Peek command to peek into the panel options, and intercept the return to read the values of these options.

9. Inbound Message Trigger

Any message received by the monitoring device from the monitoring server can be used to trigger a rule. This is useful in at least two cases:

When the event associated with the message is not supported by other trigger types. Since many events can lead to a message being received, many events can trip this trigger.

When the message is received in response to an instruction in a rule, and the rule wants to read what is in the received message. For instance, a rule could send a command for information from the backend, and intercept the return to read the information.

10. Image Sensor Triggers

One or more events from an image sensor included in a monitoring system can be used to trigger a rule.

Capture Trigger—When the image sensor captures an image, the capture trigger may be used to trigger one or more rules related to a capture event of the image sensor.

PIR Trigger—The image sensor may include a Passive InfraRed (PIR) motion sensor. When the PIR motion sensor included in the image sensor detects motion, the PIR trigger may be used to trigger one or more rules related to a motion detection event of the image sensor.

Other Triggers—Other triggers related to any events performed by the image sensor may be used to trigger rules. For instance, a battery level trigger may be used when a battery level of the image sensor falls below a threshold, a message transmission trigger may be used when the image sensor transmits a captured image to a gateway and/or the backend, etc.

Described systems, methods, and techniques may be implemented in digital electronic circuitry, computer hardware, firmware, software, or in combinations of these elements.

Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language or in assembly or machine language if desired; and in any case, the language may be a compiled or interpreted language. Suitable processors include, for example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A monitoring system comprising:
a monitoring device that is located in a building and that is configured to monitor at least a portion of the building based on output from one or more sensors; and
a monitoring server that is located remote from the building and that is configured to communicate with the monitoring device,
wherein the monitoring server comprises:
one or more processors,
one or more storage devices configured to store instructions that, when executed by the one or more processors, cause the one or more processors to:

present, to a client device, an interface configured to accept one or more parameters for a monitoring rule associated with an action the monitoring device is able to perform;
receive, from the client device, the one or more parameters; and
translate the one or more received parameters into an interpreted monitoring script and a trigger that causes performance of the interpreted monitoring script to evaluate the monitoring rule in accordance with the one or more parameters, and
a communication device configured to send the interpreted monitoring script to the monitoring device; and
wherein the monitoring device comprises:
a communication device configured to receive the interpreted monitoring script from the monitoring server, and
an interpreter configured to:
receive a signal from a sensor related to a monitoring function associated with the monitoring device,
compare the received signal to the trigger that causes performance of the interpreted monitoring script,
determine that the trigger defined by the interpreted monitoring script has been met based on comparison results,
initiate performance of the interpreted monitoring script to evaluate the monitoring rule in accordance with the one or more parameters based on the determination that the trigger has been met, and
based on the evaluation of the monitoring rule revealing that the monitoring rule has been satisfied, cause performance of the action associated with the interpreted monitoring script,
wherein the one or more storage devices included in the monitoring server include instructions that, when executed by the one or more processors, cause the one or more processors to:
emulate a monitoring system and test the interpreted monitoring script in the emulated monitoring system;
determine whether testing the interpreted monitoring script in the emulated monitoring system results in an error;
when testing the interpreted monitoring script in the emulated monitoring system results in an error, withhold sending of the monitoring script to the monitoring device and provide an alert that the interpreted monitoring script includes an error; and
when testing the interpreted monitoring script in the emulated monitoring system does not result in an error, send the monitoring script to the monitoring device.

2. The system of claim 1, wherein the one or more storage devices included in the monitoring server include instructions that, when executed by the one or more processors, cause the one or more processors to:
receive a specification of a monitoring function associated with the monitoring device; and
based on the received specification of the monitoring function, create an instruction template that includes one or more variables defined by the one or more parameters received from the client device.

3. The system of claim 1, wherein the instructions that, when executed by the one or more processors, cause the one or more processors to translate the one or more received parameters into the interpreted monitoring script include instructions that, when executed by the one or more processors, cause the one or more processors to:
create the interpreted monitoring script such that the interpreted monitoring script includes only those instructions necessary to evaluate the monitoring rule in accordance with the one or more parameters.

4. The system of claim 1, further comprising a client device configured to:
receive, from the monitoring server, the interface configured to accept the one or more parameters,
receive, from a user, a selection of the one or more parameters, and
send, to the monitoring server, an indication of the selection of the one or more parameters.

5. The system of claim 1, wherein the instructions that, when executed by the one or more processors, cause the one or more processors to emulate a monitoring system and test the interpreted monitoring script in the emulated monitoring system include instructions that, when executed by the one or more processors, cause the one or more processors to:
access information indicating a configuration of a monitoring system associated with a user of the client device; and
emulate the monitoring system associated with the user of the client device and test the interpreted monitoring script in the emulated monitoring system.

6. The system of claim 1, wherein the interpreter is configured to:
compare the received signal to a list of triggers, each trigger in the list of triggers having an associated monitoring script and causing performance of its associated monitoring script when met;
determine that a plurality of triggers included in the list of triggers have been met based on the comparison of the received signal to the list of triggers; and
based on the determination that the plurality of triggers included in the list of triggers have been met, initiating performance of the associated monitoring script for each of the plurality of triggers.

7. The system of claim 1, wherein the one or more storage devices included in the monitoring server include instructions that, when executed by the one or more processors, cause the one or more processors to:
access information indicating a configuration of a monitoring system associated with a user of the client device; and
personalize the interface based on the accessed information indicating the configuration of the monitoring system associated with the user of the client device,
wherein the instructions that, when executed by the one or more processors, cause the one or more processors to present, to the client device, the interface configured to accept the one or more parameters include instructions that, when executed by the one or more processors, cause the one or more processors to present, to the client device, the personalized interface.

8. A monitoring system comprising:
a monitoring device that is located in a building and that is configured to monitor at least a portion of the building based on output from one or more sensors; and
a monitoring server that is located remote from the building and that is configured to communicate with the monitoring device,
wherein the monitoring server comprises:
one or more processors,
one or more storage devices configured to store instructions that, when executed by the one or more processors, cause the one or more processors to:
present, to a client device, an interface configured to accept one or more parameters for a monitoring rule associated with an action the monitoring device is able to perform;

receive, from the client device, the one or more parameters; and translate the one or more received parameters into an interpreted monitoring script and a trigger that causes performance of the interpreted monitoring script to evaluate the monitoring rule in accordance with the one or more parameters, and a communication device configured to send the interpreted monitoring script to the monitoring device; and wherein the monitoring device comprises:

a communication device configured to receive the interpreted monitoring script from the monitoring server, and an interpreter configured to:

receive a signal from a sensor related to a monitoring function associated with the monitoring device, compare the received signal to the trigger that causes performance of the interpreted monitoring script, determine that the trigger defined by the interpreted monitoring script has been met based on comparison results, initiate performance of the interpreted monitoring script to evaluate the monitoring rule in accordance with the one or more parameters based on the determination that the trigger has been met, and based on the evaluation of the monitoring rule revealing that the monitoring rule has been satisfied, cause performance of the action associated with the interpreted monitoring script, wherein the monitoring device is configured to control at least one zwave-enabled light;

wherein the one or more received parameters relate to operation of an away lighting mode by the monitoring device controlling the at least one zwave-enabled light; and wherein the instructions that, when executed by the one or more processors, cause the one or more processors to translate the one or more received parameters into an interpreted monitoring script include instructions that, when executed by the one or more processors, cause the one or more processors to create a script configured to cause the monitoring device to control the at least one zwave-enabled light to operate at random intervals that mimic presence of a human in the building.

9. The system of claim 8, wherein:

the one or more storage devices included in the monitoring server include instructions that, when executed by the one or more processors, cause the one or more processors to collect information about use of the at least one zwave-enabled light by one or more occupants of the building over a period of time; and the instructions that, when executed by the one or more processors, cause the one or more processors to create a script configured to cause the monitoring device to control the at least one zwave-enabled light to operate at random intervals that mimic presence of a human in the building include instructions that, when executed by the one or more processors, cause the one or more processors to:

analyze the collected information about the use of the at least one zwave-enabled light by the one or more occupants of the building over the period of time; and generate the random intervals that mimic presence of a human in the building based on the analysis of the collected information about the use of the at least one zwave-enabled light by the one or more occupants of the building over the period of time.

10. A method comprising:

presenting, by a monitoring server to a client device, an interface configured to accept one or more parameters for a monitoring rule associated with an action a monitoring device is able to perform, the monitoring server being located remote from a building in which the monitoring device is located and being configured to communicate with the monitoring device, the monitoring device being configured to monitor at least a portion of the building based on output from one or more sensors;

receiving, from the client device, the one or more parameters;

translating the one or more received parameters into an interpreted monitoring script and a trigger that causes performance of the interpreted monitoring script to evaluate the monitoring rule in accordance with the one or more parameters;

sending, using a communication device, the interpreted monitoring script to the monitoring device;

emulating a monitoring system and testing the interpreted monitoring script in the emulated monitoring system;

determining whether testing the interpreted monitoring script in the emulated monitoring system results in an error;

when testing the interpreted monitoring script in the emulated monitoring system results in an error, withholding sending of the monitoring script to the monitoring device and providing an alert that the interpreted monitoring script includes an error; and when testing the interpreted monitoring script in the emulated monitoring system does not result in an error, sending the monitoring script to the monitoring device, wherein the monitoring device includes an interpreter that is configured to:

receive a signal from a sensor related to a monitoring function associated with the monitoring device, compare the received signal to the trigger that causes performance of the interpreted monitoring script, determine that the trigger defined by the interpreted monitoring script has been met based on comparison results, initiate performance of the interpreted monitoring script to evaluate the monitoring rule in accordance with the one or more parameters based on the determination that the trigger has been met, and based on the evaluation of the monitoring rule revealing that the monitoring rule has been satisfied, cause performance of the action associated with the interpreted monitoring script.

11. The method of claim 10, further comprising:

receiving a specification of a monitoring function associated with the monitoring device; and based on the received specification of the monitoring function, creating an instruction template that includes one or more variables defined by the one or more parameters received from the client device.

12. The system of claim 10, wherein translating the one or more received parameters into the interpreted monitoring script includes:

creating the interpreted monitoring script such that the interpreted monitoring script includes only those instructions necessary to evaluate the monitoring rule in accordance with the one or more parameters.

13. The method of claim 10, wherein emulating a monitoring system and testing the interpreted monitoring script in the emulated monitoring system includes:
   accessing information indicating a configuration of a monitoring system associated with a user of the client device; and
   emulating the monitoring system associated with the user of the client device and testing the interpreted monitoring script in the emulated monitoring system.

14. The method of claim 10, further comprising:
   accessing information indicating a configuration of a monitoring system associated with a user of the client device; and
   personalizing the interface based on the accessed information indicating the configuration of the monitoring system associated with the user of the client device,
   wherein presenting, to the client device, the interface configured to accept the one or more parameters includes presenting, to the client device, the personalized interface.

15. A method comprising:
   presenting, by a monitoring server to a client device, an interface configured to accept one or more parameters for a monitoring rule associated with an action a monitoring device is able to perform, the monitoring server being located remote from a building in which the monitoring device is located and being configured to communicate with the monitoring device, the monitoring device being configured to monitor at least a portion of the building based on output from one or more sensors;
   receiving, from the client device, the one or more parameters;
   translating the one or more received parameters into an interpreted monitoring script and a trigger that causes performance of the interpreted monitoring script to evaluate the monitoring rule in accordance with the one or more parameters; and
   sending, using a communication device, the interpreted monitoring script to the monitoring device, wherein the monitoring device includes an interpreter that is configured to:
      receive a signal from a sensor related to a monitoring function associated with the monitoring device,
      compare the received signal to the trigger that causes performance of the interpreted monitoring script,
      determine that the trigger defined by the interpreted monitoring script has been met based on comparison results,
      initiate performance of the interpreted monitoring script to evaluate the monitoring rule in accordance with the one or more parameters based on the determination that the trigger has been met, and
      based on the evaluation of the monitoring rule revealing that the monitoring rule has been satisfied, cause performance of the action associated with the interpreted monitoring script,
   wherein:
      the monitoring device is configured to control at least one zwave-enabled light;
      the one or more received parameters relate to operation of an away lighting mode by the monitoring device controlling the at least one zwave-enabled light; and
      translating the one or more received parameters into an interpreted monitoring script includes creating a script configured to cause the monitoring device to control the at least one zwave-enabled light to operate at random intervals that mimic presence of a human in the building.

16. The method of claim 15, further comprising:
   collecting information about use of the at least one zwave-enabled light by one or more occupants of the building over a period of time,
   wherein creating a script configured to cause the monitoring device to control the at least one zwave-enabled light to operate at random intervals that mimic presence of a human in the building includes:
      analyzing the collected information about the use of the at least one zwave-enabled light by the one or more occupants of the building over the period of time; and
      generating the random intervals that mimic presence of a human in the building based on the analysis of the collected information about the use of the at least one zwave-enabled light by the one or more occupants of the building over the period of time.

17. A method comprising:
   receiving, from a monitoring server and at a monitoring device, an interpreted monitoring script from the monitoring server, the monitoring device being located in a building and being configured to monitor at least a portion of the building based on output from one or more sensors, and the monitoring server being located remote from the building and being configured to:
      present, to a client device, an interface configured to accept one or more parameters for a monitoring rule associated with an action the monitoring device is able to perform;
      receive, from the client device, the one or more parameters,
      translate the one or more received parameters into the interpreted monitoring script and a trigger that causes performance of the interpreted monitoring script to evaluate the monitoring rule in accordance with the one or more parameters, and
      send the interpreted monitoring script to the monitoring device;
   receiving, at the monitoring device, a signal from a sensor related to a monitoring function associated with the monitoring device;
   comparing, at the monitoring device, the received signal to the trigger that causes performance of the interpreted monitoring script;
   determining, at the monitoring device, that the trigger defined by the interpreted monitoring script has been met based on comparison results;
   initiating, at the monitoring device, performance of the interpreted monitoring script to evaluate the monitoring rule in accordance with the one or more parameters based on the determination that the trigger has been met; and
   based on the evaluation of the monitoring rule revealing that the monitoring rule has been satisfied, causing performance of the action associated with the interpreted monitoring script wherein:
      the monitoring device is configured to control at least one zwave-enabled light;
      the one or more received parameters relate to operation of an away lighting mode by the monitoring device controlling the at least one zwave-enabled light; and
      causing performance of the action associated with the interpreted monitoring script comprises controlling the at least one zwave-enabled light to operate at random intervals that mimic presence of a human in the building.

18. The method of claim 17, further comprising:

comparing the received signal to a list of triggers, each trigger in the list of triggers having an associated monitoring script and causing performance of its associated monitoring script when met;

determining that a plurality of triggers included in the list of triggers have been met based on the comparison of the received signal to the list of triggers; and based on the determination that the plurality of triggers included in the list of triggers have been met, initiating performance of the associated monitoring script for each of the plurality of triggers.

* * * * *